(12) United States Patent
Doida (10) Patent No.: US 8,243,154 B2
(45) Date of Patent: Aug. 14, 2012

(54) IMAGE PROCESSING APPARATUS, DIGITAL CAMERA, AND RECORDING MEDIUM

(75) Inventor: Shigeru Doida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 328 days.

(21) Appl. No.: 12/727,032

(22) Filed: Mar. 18, 2010

(65) Prior Publication Data

US 2010/0253798 A1     Oct. 7, 2010

(30) Foreign Application Priority Data

Apr. 2, 2009   (JP) .................................. 2009-089785

(51) Int. Cl.
*H04N 5/202* (2006.01)
*H04N 5/235* (2006.01)
*G06K 9/40* (2006.01)

(52) U.S. Cl. ...................... 348/221.1; 348/254; 382/275

(58) Field of Classification Search ............... 348/221.1, 348/254, 364; 382/275
See application file for complete search history.

(56) References Cited

U.S. PATENT DOCUMENTS

| | | | |
|---|---|---|---|
| 6,754,399 B2* | 6/2004 | Pettigrew et al. | 382/276 |
| 7,680,354 B2* | 3/2010 | Mei et al. | 382/255 |
| 8,036,488 B2* | 10/2011 | Nagumo | 382/275 |
| 2005/0041854 A1* | 2/2005 | Pettigrew et al. | 382/162 |
| 2005/0190288 A1* | 9/2005 | Yamada | 348/371 |
| 2005/0225662 A1* | 10/2005 | Tsuda et al. | 348/360 |
| 2006/0018537 A1* | 1/2006 | Wu et al. | 382/168 |
| 2006/0133688 A1* | 6/2006 | Kang et al. | 382/254 |
| 2007/0223831 A1* | 9/2007 | Mei et al. | 382/260 |
| 2008/0074516 A1* | 3/2008 | Bussmann | 348/254 |
| 2008/0175519 A1* | 7/2008 | Nagumo | 382/299 |
| 2009/0091661 A1* | 4/2009 | Wu et al. | 348/687 |
| 2009/0092337 A1* | 4/2009 | Nagumo | 382/299 |
| 2009/0153659 A1* | 6/2009 | Landwehr et al. | 348/135 |

FOREIGN PATENT DOCUMENTS

JP   A-2006-135838   5/2006

* cited by examiner

*Primary Examiner* — Sinh Tran
*Assistant Examiner* — Selam Gebriel
(74) *Attorney, Agent, or Firm* — Oliff & Berridge, PLC (57) ABSTRACT

A proposition is to perform a detection of a position shift amount between images which are anteroposterior in a chronological order with high accuracy. Therefore, in an image processing apparatus, a unit A performs a geometric transformation on a pixel group α in an image 1 using an input position shift amount as a parameter, and calculates a gain based on a luminance difference between the pixel group α in the image 1 being performed the transformation and pixels in an image 2 existing at an identical coordinate as the pixel group α. Besides a unit B multiplies an input gain to the image 2 and calculates a position shift amount between the image 1 and the image 2. A detecting unit executes the unit A and the unit B for at least one time or more.

15 Claims, 5 Drawing Sheets

IMAGE PROCESSING APPARATUS, DIGITAL CAMERA, AND RECORDING MEDIUM

CROSS REFERENCE TO RELATED APPLICATION

This application is based upon and claims the benefit of priority from Japanese Patent Application No. 2009-089785, filed on Apr. 2, 2009, the entire contents of which are incorporated herein by reference.

BACKGROUND

1. Field

The present application relates to an image processing apparatus, a digital camera, and a recording medium.

2. Description of the Related Art

Conventionally, a method detecting a position shift amount between images (a change amount of a subject and so on between images) is known to perform positioning of the images which are anteroposterior in chronological order such as a moving image photographed by a digital camera.

Incidentally, when the position shift amount is detected, there is a problem in which detection accuracy deteriorates if exposing conditions are different between images being detection objects.

As an example of a conventional art to solve the problem, for example, an art is disclosed in Patent Document 1 (Japanese Unexamined Patent Application Publication No. 2006-135838) in which exposure states between images are matched by normalizing luminance values of images acquired sequentially by using information of changed exposing conditions when the exposing conditions (shutter speed, gain, and so on) are changed caused by an automatic exposure controlling operation during a moving image is photographed, and thereby, a detection of a position shift amount between images is enabled with high accuracy.

However, this conventional art is to match the exposure states between images by using the information when the exposing conditions are already known. As a result, it is impossible to perform the detection of the position shift amount between images with high accuracy because this art cannot be applied when the exposing conditions of the images are not known.

SUMMARY

The present application is to solve problems of the above-stated conventional art. A proposition of the present embodiment is to provide an image processing apparatus, a digital camera, and a recording medium capable of performing a detection of a position shift amount between images which are anteroposterior in a chronological order such as a moving image with high accuracy.

The image processing apparatus according to the present embodiment is the image processing apparatus detecting a change amount between a first image and a second image which are anteroposterior in the chronological order, in which a gain calculating unit, a position shift amount calculating unit, and a detecting unit are included. The gain calculating unit performs a geometric transformation on a specific pixel group α extracted from the first image using an input position shift amount as a geometric transformation parameter, and calculates a gain value based on a luminance difference between pixels of the specific pixel group α in the first image after the geometric transformation is performed and pixels in the second image existing at an identical coordinate as the pixels of the specific pixel group α. The position shift amount calculating unit multiplies an input gain value to the second image, extracts a specific pixel group β from the first image, and calculates a position shift amount by estimating a position change amount of the specific pixel group β between the first image and the second image to which the input gain value is multiplied. The detecting unit detects the change amount between the first image and the second image by executing the gain calculating unit and the position shift amount calculating unit for at least one time or more using the position shift amount calculated by the position shift amount calculating unit as an input for the gain calculating unit and the gain value calculated by the gain calculating unit as an input for the position shift amount calculating unit.

Incidentally, the specific pixel group α may be an aggregation of pixels having an intermediary tone value in the first image.

The specific pixel group α may be all of pixels existing in an oblong area where pixels having the intermediary tone value are included for a predetermined number or more in the first image.

The specific pixel group β may be an aggregation of pixels of which a luminance difference with an adjacent pixel is a predetermined threshold value or more among pixels in the first image.

The specific pixel group β may be all of pixels existing in an oblong area where pixels of which luminance difference with the adjacent pixel is the predetermined threshold value or more are included for the predetermined number or more in the first image.

A digital camera according to the present embodiment includes an imaging unit capturing a plurality of pieces of images which are anteroposterior in a chronological order, and an image processing apparatus according to the present embodiment treating the plurality of pieces of images captured by the imaging unit as an object of image processing.

A recording medium according to the present embodiment storing an image processing program executable by a computer which detects a change amount between a first image and a second image which are anteroposterior in a chronological order, in which the image processing program includes a gain calculating step, a position shift amount calculating step, and a detecting step. In the gain calculating step, a geometric transformation is performed on a specific pixel group α extracted from the first image using an input position shift amount as a geometric transformation parameter, and a gain value is calculated based on a luminance difference between pixels of the specific pixel group α in the first image after the geometric transformation is performed and pixels in the second image existing at an identical coordinate as the pixels of the specific pixel group α. In the position shift amount calculating step, an input gain value is multiplied to the second image, a specific pixel group β is extracted from the first image, and a position shift amount is calculated by estimating a position change amount of the specific pixel group β between the first image and the second image to which the input gain value is multiplied. In the detecting step, the change amount between the first image and the second image is detected by executing the gain calculating step and the position shift amount calculating step for at least one time or more using the position shift amount calculated by the position shift amount calculating step as an input for the gain calculating step and the gain value calculated by the gain calculating step as an input for the position shift amount calculating step.

Incidentally, the specific pixel group α may be an aggregation of pixels having an intermediary tone value in the first image.

The specific pixel group α may be all of pixels existing in an oblong area where pixels having an intermediary tone value are included for a predetermined number or more in the first image.

The specific pixel group β may be an aggregation of pixels of which luminance difference with an adjacent pixel is a predetermined threshold value or more among the pixels in the first image.

The specific pixel group β may be all of pixels existing in an oblong area where pixels of which luminance difference with an adjacent pixel is a predetermined threshold value or more are included for a predetermined number or more in the first image.

DETAILED DESCRIPTION OF THE EMBODIMENT

Hereinafter, embodiments of the present application are described. The present embodiment is an embodiment of a digital camera.

Figure 1:
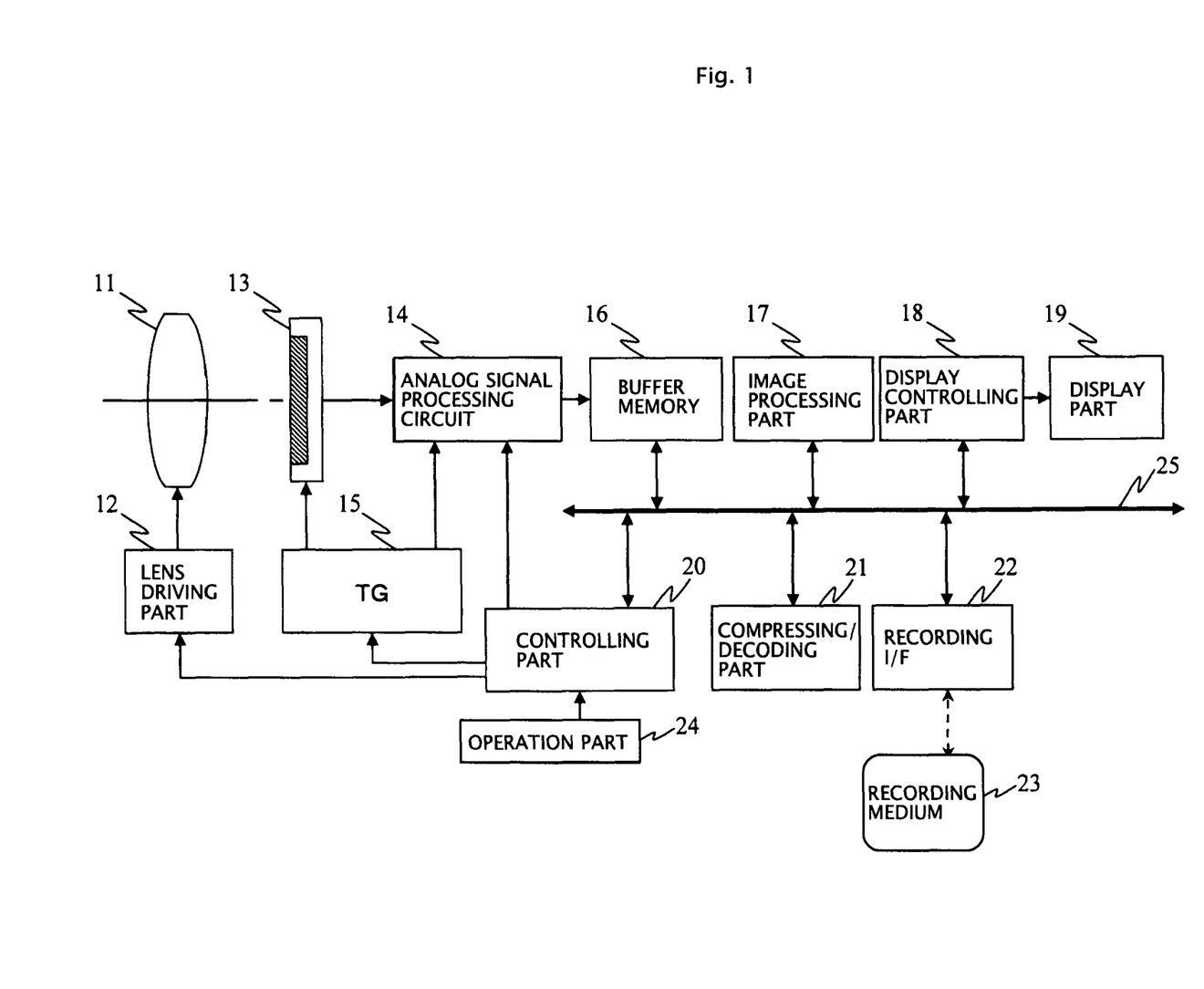
FIG. 1 is a block diagram illustrating an example of a configuration of a digital camera to which the present embodiment is applied.

FIG. 1 is a block diagram of a digital camera according to the present embodiment.

The digital camera includes a shooting lens 11, a lens driving part 12, an imaging device 13, an analog signal processing circuit 14, a timing generator (TG) 15, a buffer memory 16, an image processing part 17, a display controlling part 18, a display part 19, a controlling part 20, a compressing/decoding part 21, a recording interface (recording I/F) 22, a recording medium 23, an operation part 24, and a bus 25. Here, the buffer memory 16, the image processing part 17, the display controlling part 18, the controlling part 20, the compressing/decoding part 21, and the recording I/F 22 are coupled via the bus 25. Besides, the lens driving part 12, the analog signal processing circuit 14, the TG 15, and the operation part 24 are each coupled to the controlling part 20.

The shooting lens 11 is made up of plural lens groups including a focus lens and a zoom lens. Note that the shooting lens 11 is illustrated as a piece of lens in FIG. 1 for simplicity purposes.

The lens driving part 12 generates a lens driving signal in accordance with an instruction of the controlling part 20, performs a focus adjustment and a zoom adjustment by moving the shooting lens 11 in an optical axis direction, and forms a subject image by a luminous flux passing through the shooting lens 11 on a light-receiving surface of the imaging device 13.

The imaging device 13 is an imaging device capable of photographing moving images, and it is made up of, for example, a CCD type imaging device, a CMOS type imaging device, or the like. Incidentally, it is needless to say that the imaging device 13 is capable of photographing still images by each frame.

The imaging device 13 is disposed at an image space side of the shooting lens 11, and generates an analog image signal by performing a photoelectric conversion of the subject image formed on the light-receiving surface thereof. An output of the imaging device 13 is coupled to the analog signal processing circuit 14.

The analog signal processing circuit 14 performs analog signal processing such as a CDS (Correlated Double Sampling), a gain adjustment, and an A/D conversion for the analog image signal output from the imaging device 13, and outputs an image signal after the processing in accordance with the instruction of the controlling part 20. Note that an output of the analog signal processing circuit 14 is coupled to the buffer memory 16.

Besides, the analog signal processing circuit 14 sets an adjusting amount of the gain adjustment based on the instruction of the controlling part 20, and thereby, performs an adjustment of sensitivity corresponding to an ISO sensitivity.

The TG 15 supplies timing pulses for the imaging device 13 and the analog signal processing circuit 14 based on the instruction of the controlling part 20. Driving timings of the imaging device 13 and the analog signal processing circuit 14 are controlled by the timing pulses.

The buffer memory 16 temporary stores the image signal output from the analog signal processing circuit 14 as an image data. Besides, the buffer memory 16 temporary stores an image data read by the controlling part 20 from the recording medium 23, and an image data generated during a process of the processing by the controlling part 20.

The image processing part 17 performs image processing such as a white balance adjustment, an interpolation, an edge enhancement, a gamma correction, and a resolution conversion (number of pixels conversion) for the image data of the buffer memory 16 in accordance with the instruction of the controlling part 20. Incidentally, the resolution conversion (the number of pixels conversion) is the processing necessary when a thumbnail of the image data is generated, and when the image data is displayed on the display part 19. The image processing part 17 is made up as an ASIC and so on.

The display controlling part 18 performs predetermined signal processing (for example, signal processing to convert into a complex video signal in NTSC system) for the image data after the image processing, and outputs to the display part 19 in accordance with the instruction of the controlling part 20. The image data is displayed on the display part 19 by this output. Incidentally, the display part 19 is an LCD monitor provided at a rear surface or the like of a digital camera case, an electronic viewfinder including an eyepiece unit and so on.

The compressing/decoding part 21 performs compression processing or decoding processing for the image data of the buffer memory 16 in accordance with the instruction of the controlling part 20. Note that the compression processing and the decoding processing are performed by, for example, JPEG (Joint Photographic Experts Group) format and so on at a still image photographing time, and by, for example, an MPEG (Moving Picture Experts Group) format and so on at a moving image photographing time.

Besides, the compressing/decoding part 21 has a configuration capable of performing a lossless compression (so-called a lossless coding).

A connector is formed at the recording I/F 22 to couple the recording medium 23. The recording I/F 22 accesses the recording medium 23 coupled to the connector, to perform writing and reading of various data. The controlling part 20 records the image data of the buffer memory 16 after the compression processing to the recording medium 23 via the recording I/F 22 at the photographing time. Incidentally, the controlling part 20 records the image data of the buffer memory 16 after the image processing to the recording medium 23 as a non-compressed state without performing the compression processing when the digital camera is set to a non-compression recording mode. Besides, the controlling part 20 reads the recorded image data from the recording medium 23 via the recording I/F 22 and records to the buffer memory 16 at an image reproducing time. Incidentally, the recording medium 23 is a memory card housing a semiconductor memory, a small-sized hard disk, and so on.

The operation part 24 includes various operation members such as a mode setting button, a release button, and a moving image photographing button, and transmits operation signals to the controlling part 20 in accordance with contents of the operation of the members by a user such as a photographer.

The controlling part 20 performs total controlling of each part of the digital camera in accordance with the operation contents of the operation member by the user.

For example, when the moving image photographing button is pressed during an operation in a photographing mode, the controlling part 20 drives the lens driving part 12, the analog signal processing circuit 14, and the TG 15 to start the photographing of the moving image. At this time, the imaging device 13 is driven such that an image having the predetermined number of pixels is acquired with a predetermined frame rate, and an image data corresponding to each frame of the moving image is sequentially recorded to the buffer memory 16 via the analog signal processing circuit 14. Subsequently, the controlling part 20 performs the image processing for the image data of each frame recorded on the buffer memory 16 by driving the image processing part 17. Besides, the controlling part 20 displays the image data after the image processing on the display part 19 by driving the display controlling part 18. The controlling part 20 performs the compression processing by the MPEG format and so on for the image data after the image processing by driving the compressing/decoding part 21, and records the compressed data (moving image data) to the recording medium 23 via the recording I/F 22.

Besides, when the moving image photographing button is pressed again during the moving image is photographed, the controlling part 20 stops the photographing of the moving image.

Hereinafter, operations according to a position shift detection performed by the digital camera of the present embodiment are described with reference to a flowchart in FIG. 2.

Incidentally, the position shift detection is processing to detect an amount (position shift amount) of a change (moving, rotation, deformation, enlarging/reducing, and so on) of a focused subject and so on between frame images which are anteroposterior in chronological order such as a moving image. For example, it is performed as motion detecting processing in motion-compensating performed when an MPEG (in particular, MPEG-4) compression coding is performed at the time when the moving image is photographing time.

Figure 2:
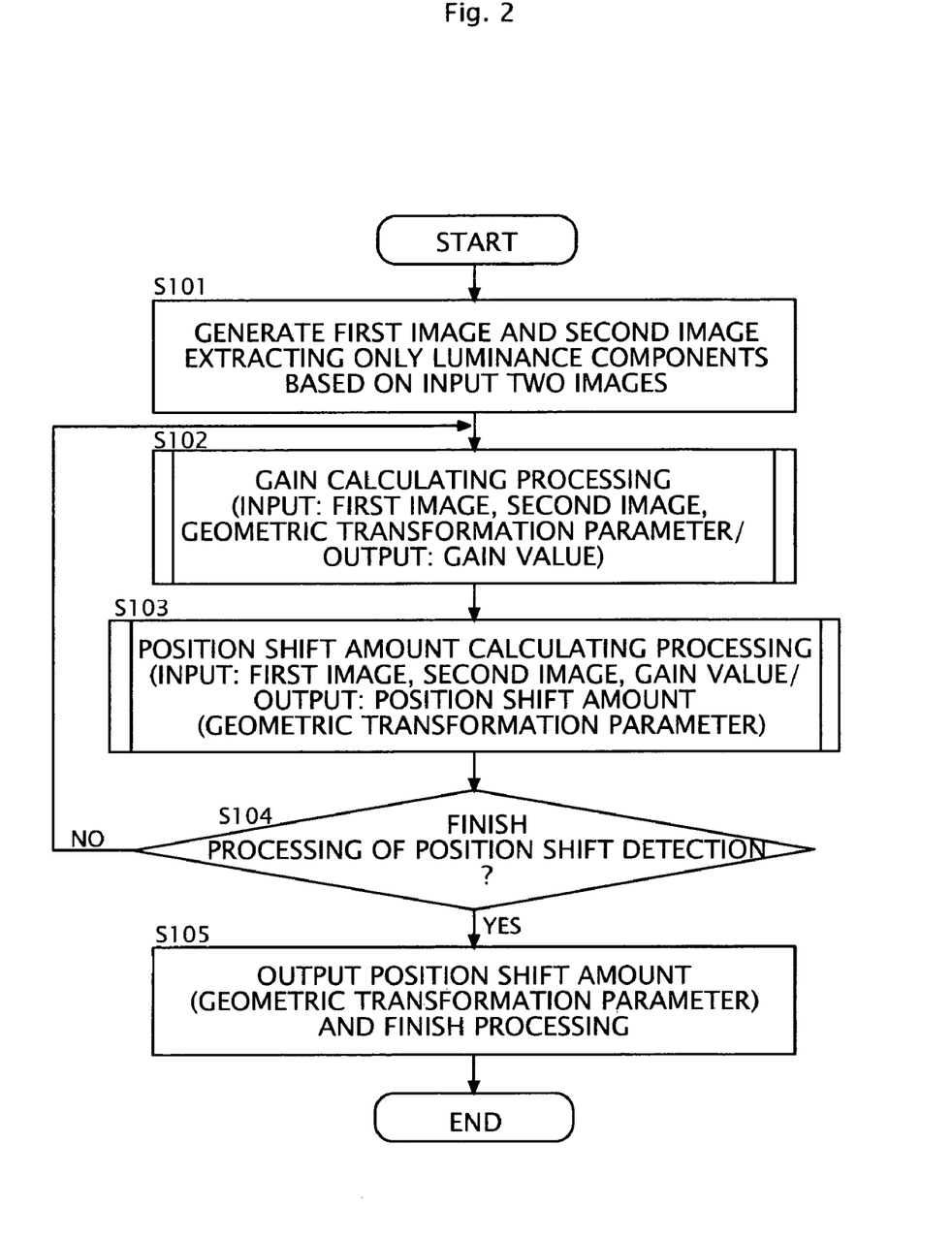
FIG. 2 is a flowchart illustrating operations according to a position shift detection performed by the digital camera.

In the position shift detecting processing illustrated in FIG. 2, the position shift detection is performed and a position shift amount is output as for input two image, namely, two frames which are anteroposterior in chronological order selected as objects of detection from frames of the moving images recorded on the buffer memory 16, for example, as for images of an "n−1"th frame and an n-th frame.

Step S101: The controlling part 20 generates an image which includes only luminance components extracted from the input image. Specifically, the controlling part 20 generates two images of a first image which includes only the luminance components extracted from the image of the (n−1) th frame being the former frame in chronological order and a second image which includes only the luminance components extracted from the image of the n-th frame being the latter frame in chronological order. Incidentally, when the gamma correction (gamma transformation) is performed for the image of the selected frame, an image in which only the luminance components are extracted is generated after an inverse gamma correction (inverse gamma transformation) is once performed for the image of the frame so that the luminance components are returned to a state in a linear characteristic.

The controlling part 20 performs the position shift detection processing illustrated in the following steps for the generated first image and second image.

Step S102: The controlling part 20 calls a gain calculating processing (subroutine 1) illustrated in FIG. 3 while using the first image and the second image, a geometric transformation parameter calculated by a later-described position shift amount calculating processing as inputs.

(Gain Calculating Processing)

Step S102-1 (FIG. 3): The controlling part 20 performs an extraction of a specific pixel group α from the input first image. Incidentally, the calculation of gain is performed based on the specific pixel group α, and therefore, a correct result cannot be obtained if there is white blow or black crush in pixels included therein. Accordingly, here, pixels (aggregation) each having an intermediary tone value in the first image are extracted as the specific pixel group α. Specifically, for example, a luminance mean value of the pixels included in the first image is calculated, and pixels having a luminance value (tone value) in a vicinity of the luminance mean value (including a pixel having the luminance mean value) are specified from among the first image, and these pixels are extracted as the specific pixel group α. Otherwise, pixels without white blow or black crush in a vicinity of an AF (Auto Focus) point may be extracted as the specific pixel group α instead of the pixels having the intermediary tone value.

Figure 3:
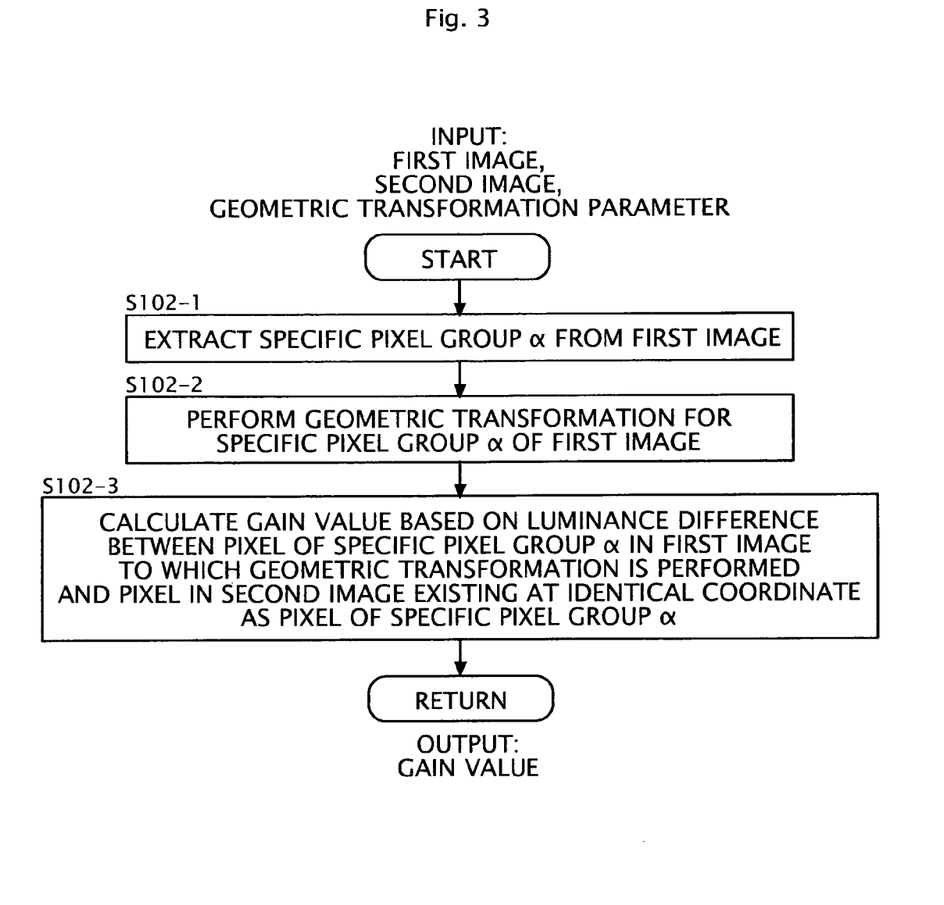
FIG. 3 is a flowchart of a gain calculating processing (subroutine 1).
Figure 4:
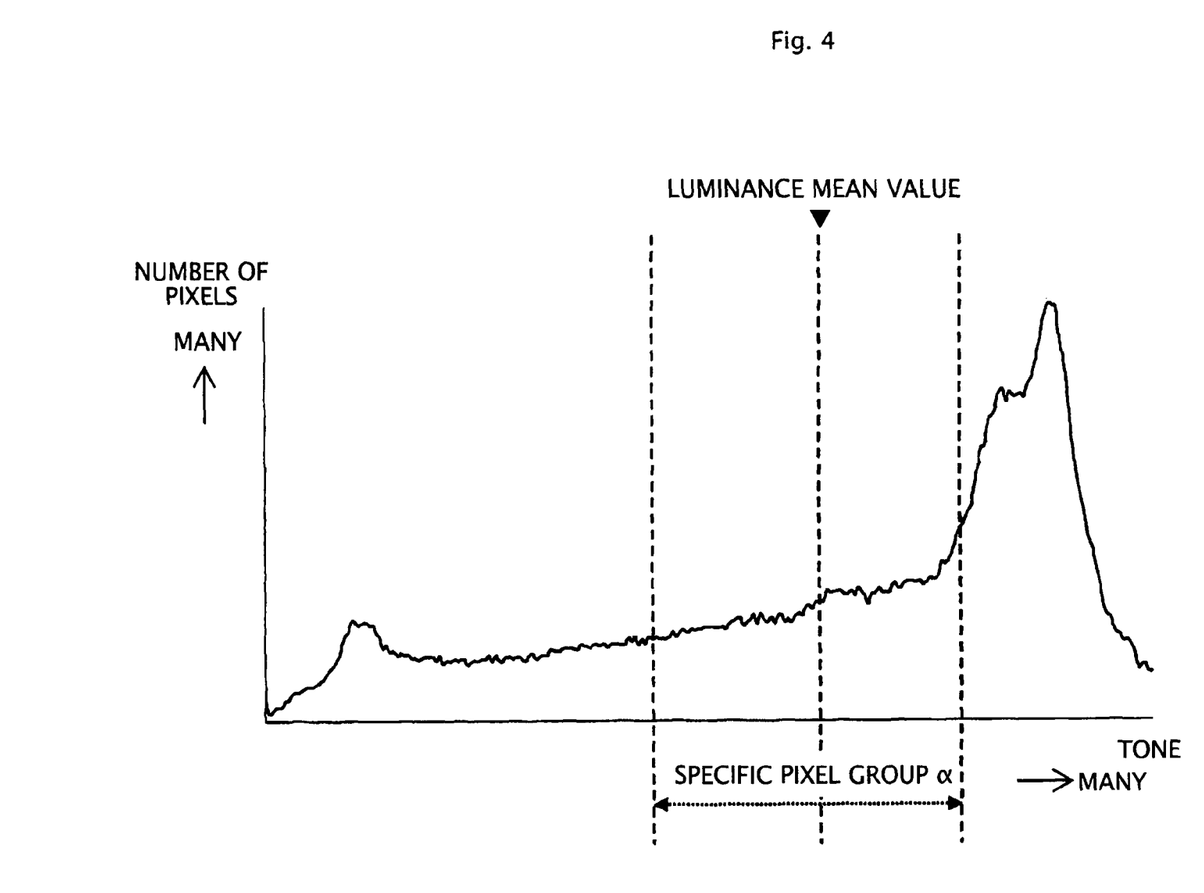
FIG. 4 is a view explaining an example of extraction of a specific pixel group α.

Incidentally, the specific pixel group α may be a group (aggregation) of which unit is a pixel as stated above, or may be a group (aggregation) of which unit is an area such as an oblong area in the image where many pixels having the intermediary tone value are included (for example, included for the predetermined number or more).

Step S102-2 (FIG. 3): The controlling part 20 performs the geometric transformation for a pixel (x, y) of the extracted specific pixel group α. In the digital camera according to the present embodiment, a geometric transformation model represented in the following (expression 1) is used. The geometric transformation for the pixel (x, y) of the specific pixel group α is performed by assigning geometric transformation parameters which are input parameters to parameters p ($p_0$ to $p_5$) of the model. Incidentally, when the subroutine 1 is executed for the first time, the process is transferred to step S102-3 without performing the geometric transformation because the geometric transformation parameters p ($p_0$ to $p_5$) are not calculated and they are not input yet.

$$f(x, y; p) = \begin{pmatrix} 1+p_0 & p_2 & p_4 \\ p_1 & 1+p_3 & p_5 \end{pmatrix} \begin{pmatrix} x \\ y \end{pmatrix} \quad (1)$$

Step S102-3 (FIG. 3): The controlling part 20 performs a gain calculation based on a luminance difference between the pixel of the specific pixel group α in the first image to which the geometric transformation is performed and the pixel in the second image existing at an identical coordinate position as the pixel in the first image. Incidentally, when the subroutine 1 is executed for the first time, the geometric transformation is not performed as stated above, and therefore, the gain calculation is performed simply based on the luminance difference between the pixel of the specific pixel group α in the first image and the pixel in the second image existing at the identical coordinate position as the pixel in the first image.

Here, the pixel of the specific pixel group α in the first image is set as "Aα", the pixel (aggregation) in the second image existing at the identical coordinate position as the "Aα" is set as "Bα", and the gain to be calculated is set as "r". Then a square sum "S" of the difference between the pixels of the "Aα", "Bα" is represented by the following (expression 2). Note that the "n" in the (expression 2) is the number of pixels included in the specific pixel group α.

$$S = \sum_n [A_\alpha(x, y) - r B_\alpha(x, y)]^2 \quad (2)$$

Accordingly, when the "r" (gain) is asked by a least squares method such that the "S" in the above-stated (expression 2) becomes the minimum, the "r" can be represented by the following (expression 3).

$$r = \frac{\sum_n [A_\alpha(x, y) B_\alpha(x, y)]}{\sum_n [A_\alpha(x, y)]^2} \quad (3)$$

The controlling part 20 calculates the "r" (gain) asked by the above-stated (expression 3) as a gain value being an output of the subroutine 1, and thereafter, returns to the processing of the flowchart in FIG. 2, and transfers to step S103.

Step S103: The controlling part 20 calls a position shift amount calculating processing (subroutine 2) illustrated in FIG. 5 by using the first image and the second image, and the gain value calculated by the above-stated gain calculating processing (subroutine 1) as inputs.

Figure 5:
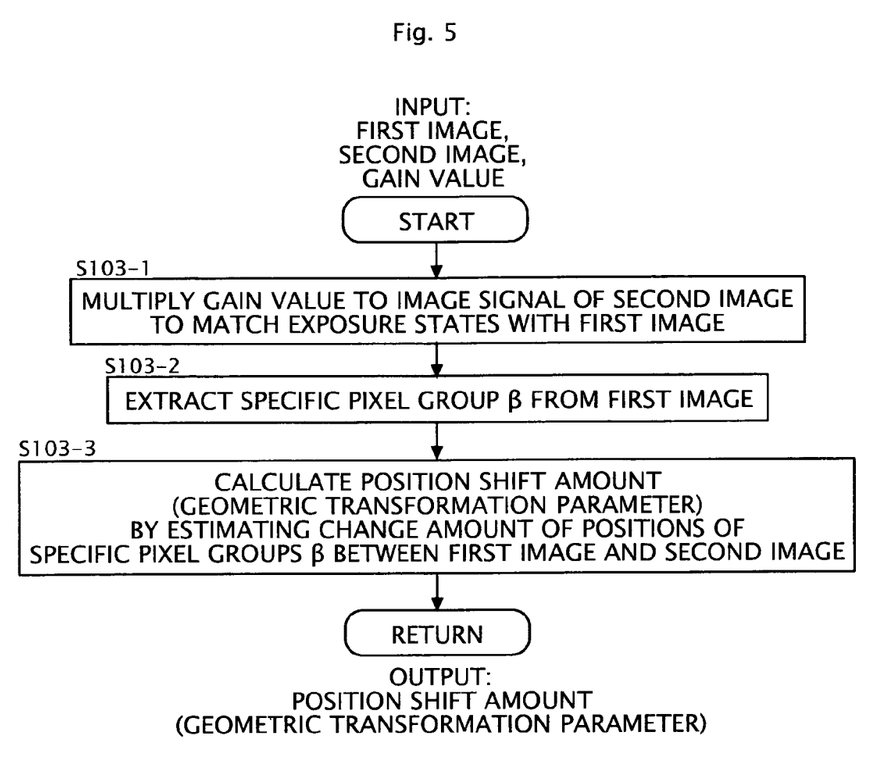
FIG. 5 is a flowchart of a position shift amount calculating processing (subroutine 2).

Note that the first image and the second image used as the inputs are original images generated when the processing of the step S101 is performed.

(Position Shift Amount Calculating Processing)

Step S103-1 (FIG. 5): The controlling part 20 multiplies the input gain value, namely, the "r" asked by the above-stated (expression 3) to an image signal of the input second image. Exposure states of the two images of which position shift detection is to be performed, namely, the input first image and second image are thereby matched.

Step S103-2 (FIG. 5): The controlling part 20 performs an extraction of a specific pixel group β from the input first image. Note that, here, it is necessary to extract a pixel group suitable for the calculation of the position shift amount. Accordingly, the extraction is performed with a condition different from the condition when the specific pixel group α is extracted in the above-stated gain calculating processing (subroutine 1). Specifically, for example, the specific pixel group β is extracted under the condition such that a pixel of which luminance difference with an adjacent pixel is a predetermined threshold value or more.

Incidentally, the specific pixel group β may be a group (aggregation) of which unit is a pixel, or a group (aggregation) of which unit is an area such as an oblong area.

Step S103-3 (FIG. 5): The controlling part 20 calculates the position shift amount between the first image and the second image.

Specifically, a pixel of the specific pixel group β in the first image when the geometric transformation is performed by using the above-stated (expression 1) is set as "Aβ", a pixel (aggregation) in the second image existing at an identical coordinate position as the "Aβ" is set as "Bβ", a geometric transformation parameter p ($p_0$ to $p_5$) when an evaluation value "ΔE" satisfying the following (expression 4) becomes the minimum is calculated as the position shift amount.

$$\Delta E = \sum_n [A_\beta(f(x, y; p)) - B_\beta(x, y)]^2 \quad (4)$$

Incidentally, when the geometric transformation is performed by using a method other than the above-stated (expression 1) (for example, an affine transformation and so on), it is preferable that the specific pixel group β is extracted with the condition suitable for the method used for the geometric transformation, in the step S103-2.

The controlling part 20 calculates the geometric transformation parameter p ($p_0$ to $p_5$) as the position shift amount being an output of the subroutine 2, and thereafter, returns to the processing of the flowchart in FIG. 2, and transfers to step S104.

Step S104: The controlling part 20 determines whether or not the processing of the position shift detection is finished.

Specifically, when the gain calculating processing (subroutine 1) and the position shift amount calculating processing (subroutine 2) are executed for the predetermined number of times, or when a difference between the position shift amount (geometric transformation parameter p) calculated this time and the position shift amount calculated the previous time is small (for example, a predetermined threshold value or less), the controlling part 20 transfers to step S105 to finish the position shift detection processing.

On the other hand, when the gain calculating processing and the position shift amount calculating processing are not executed for the predetermined number of times, or when the difference between the position shift amount calculated this time and the position shift amount calculated the previous time is, for example, the predetermined threshold value or more, the controlling part 20 transfers to the step S102 to repeat the above-stated processing. Incidentally, in this case, the first image and the second image used as the inputs for the calling of the gain calculating processing (subroutine 1) at the step S102 after transition are the original images generated when the processing of the above-stated step S101 is performed. Besides, at this time, the position shift amount output by the above-stated position shift amount calculating processing (subroutine 2) (namely, the geometric transformation parameter p ($p_0$ to $p_5$)) is assigned as the geometric transformation parameter which is the another input of the gain calculating processing (subroutine 1).

Step S105: The controlling part 20 outputs the geometric transformation parameter p ($p_0$ to $p_5$) calculated at the position shift amount calculating processing (subroutine 2) as the position shift amount between the input two images (for example, between the images at the "n−1"th frame and the "n"th frame, and finishes the processing of the flowchart (FIG. 2).

(Supplementary Items to the Embodiment)

Incidentally, in the geometric transformation model of the above-stated (expression 1), the geometric transformation parameters p are set to be six parameters of $p_0$ to $p_5$, but the number of parameters may be set to be more than six. The more the number of parameters is, the more detail the position shift detection is enabled.

Besides, when the specific pixel group α and the specific pixel group β are extracted, the condition (or reference) of the extraction may be made severe in accordance with the number of repeated execution times of the gain calculating processing (subroutine 1) and the position shift amount calculating processing (subroutine 2), or the pixels extracted as the specific pixel group may be further narrowed down so that the number of pixels becomes small. As a result, high speeding of the calculation in the position shift detection is enabled.

Besides, it is described that the position shift amount calculating processing (subroutine 2) is executed after the gain calculating processing (subroutine 1) is executed, but the execution order thereof may be reversed. In that case, in the position shift amount calculating processing (subroutine 2) executed in advance, the processing is transferred to the step S103-2 as it is while omitting the processing of the step S103-1 in which the gain value is multiplied to the image signal of the second image, because the gain value (the "r" asked by the above-stated (expression 3)) is not calculated yet at the first execution time.

Besides, when the execution order is reversed, a determination whether or not a difference between the gain value calculated the previous time and the gain value calculated this time is small may be added to the determination whether or not the processing of the position shift detection is finished at the step S104.

Incidentally, when the determination is added, in the step S104, the controlling part 20 transfers to the step S105 to finish the processing of the position shift detection when the position shift amount calculating processing (subroutine 2) and the gain calculating processing (subroutine 1) are executed for the predetermined number of times, when the difference between the position shift amount calculated the previous time (geometric transformation parameter p) and the position shift amount calculated this time is small (for example, the predetermined threshold value or less), or when the difference between the gain value (the "r" asked by the (expression 3)) calculated the previous time and the gain value calculated this time is small (for example, the predetermined threshold value or less).

On the other hand, when the position shift amount calculating processing and the gain calculating processing are not executed for the predetermined number of times, when the difference between the position shift amount calculated this time and the position shift amount calculated the previous time is, for example, the predetermined threshold value or more, or when the difference between the gain value calculated the previous time and the gain value calculated this time is, for example, the predetermined threshold value or more, the controlling part 20 transfers to the step S102 to repeat the position shift detection processing.

(Operation and Effect of Embodiment)

As stated above, in the digital camera according to the present embodiment, the following calculations are performed as the image processing to detect the change amount between the first image and the second image which are anteroposterior in chronological order.

In the gain calculating processing (subroutine 1), the specific pixel group α is extracted from the first image, and the geometric transformation is performed for the specific pixel group α. Note that the input position shift amount is assigned as the geometric transformation parameter in the geometric transformation. This position shift amount is calculated by the later-described position shift amount calculating processing (subroutine 2). The gain value is then calculated based on the luminance difference between the pixel of the specific pixel group α in the first image after the geometric transformation is performed and the pixel in the second image existing at the identical coordinate as the pixel of the specific pixel group α.

Besides, in the position shift amount calculating processing (subroutine 2), the input gain value is multiplied to the second image. Note that this gain value is calculated by the above-stated gain calculating processing (subroutine 1). The specific pixel group β is extracted from the first image, and the change amount of the positions of the specific pixel groups β between the first image and the second image to which the gain value is multiplied is estimated to calculate the position shift amount. Specifically, the pixel of the specific pixel group β in the first image when the geometric transformation is performed by using the (expression 1) is set as "Aβ", the pixel (aggregation) in the second image existing at the identical coordinate position as the "Aβ" is set as "Bβ", then the geometric transformation parameter p ($p_0$ to $p_5$)) in which the evaluation value "ΔE" satisfying the (expression 4) becomes the minimum is calculated as the position shift amount.

The change amount between the first image and the second image is detected by executing these gain calculating processing (subroutine 1) and the position shift amount calculating processing (subroutine 2) for at least one time or more.

Namely, the gain value calculated at the gain calculating processing (subroutine 1) is calculated based on the luminance difference between the pixel of the specific pixel group α in the first image after the geometric transformation is performed by using the position shift amount (geometric transformation parameter) calculated by the position shift amount calculating processing (subroutine 2) and the pixel in the second image existing at the identical coordinate as the pixel of the specific pixel group α. Note that the specific pixel group α is the aggregation of the pixels having the intermediary tone value in the first image, or all of the pixels existing in the oblong area in the first image where the pixels having the intermediary tone value are included for the predetermined number or more. Accordingly, the gain value calculated as stated above becomes a suitable value to match the exposure states between the first image and the second image.

Besides, the position shift amount calculated at the position shift amount calculating processing (subroutine 2) is calculated by estimating the change amount of the positions of the specific pixel groups β between the first image and the second image in which the exposure states are matched by using the gain value calculated by the gain calculating processing (subroutine 1). Note that the specific pixel group β is the aggregation of the pixels of which luminance difference with the adjacent pixel is the predetermined threshold value or more from among the pixels in the first image, or all of the pixels existing in the oblong area in which the pixels of their luminance difference with the adjacent pixel is the predetermined threshold value or more are included for the predetermined number or more from among the first image. Accordingly, the position shift amount (geometric transformation parameter) calculated as stated above represents the change amount between the first image and the second image with high accuracy.

These gain calculating processing (subroutine 1) and the position shift amount calculating processing (subroutine 2) are executed for at least one time or more. Accordingly, the values of the calculated gain value and the position shift amount (geometric transformation parameter) become the ones with higher accuracy.

Consequently, according to the digital camera of the present embodiment, it is possible to perform the detection of the position shift amount between images which are anteroposterior in chronological order such as the moving image with high accuracy. In particular, according to the digital camera of the present embodiment, it is possible to perform the detection of the position shift amount between the images with high accuracy even when the exposing conditions are different between the images being the detection objects and when the exposing conditions are not clear.

(Other Matters)

Note that a part or all of programs according to operations of the above-stated digital camera may be executed by an external processing unit such as a computer. In this case, necessary programs are installed to the external processing unit via a computer readable recording medium such as a CD-ROM, a communication network such as an Internet, or the like.

Besides, an example of the digital camera is described in the above, but the present invention can be applied to the other equipments capable of photographing images which are anteroposterior in chronological order such as a moving image, for example, to a digital video camera, a cellular phone, and so on.

The many features and advantages of the embodiment are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus detecting a change amount between a first image and a second image which are anteroposterior in a chronological order, the image processing apparatus comprising:
    a gain calculating unit performing a geometric transformation on a specific pixel group $\alpha$ extracted from the first image using an input position shift amount as a geometric transformation parameter, and calculating a gain value based on a luminance difference between pixels of the specific pixel group a in the first image after the geometric transformation is performed and pixels in the second image existing at an identical coordinate as the pixels of the specific pixel group $\alpha$;
    a position shift amount calculating unit multiplying the gain value being input to the second image, extracting a specific pixel group $\beta$ from the first image, and calculating a position shift amount by estimating a position change amount of the specific pixel group $\beta$ between the first image and the second image to which the gain value is multiplied; and
    a detecting unit detecting the change amount by executing the gain calculating unit and the position shift amount calculating unit for at least one time or more using the position shift amount calculated by the position shift amount calculating unit as an input for the gain calculating unit and the gain value calculated by the gain calculating unit as an input for the position shift amount calculating unit.

2. The image processing apparatus according to claim 1, wherein
    the specific pixel group $\alpha$ is an aggregation of pixels having an intermediary tone value in the first image.

3. The image processing apparatus according to claim 1, wherein
    the specific pixel group cc is all of pixels existing in an oblong area where pixels having an intermediary tone value are included for a predetermined number or more in the first image.

4. The image processing apparatus according to claim 1, wherein
    the specific pixel group $\beta$ is an aggregation of pixels of which a luminance difference with an adjacent pixel is a predetermined threshold value or more among pixels in the first image.

5. The image processing apparatus according to claim 1, wherein
    the specific pixel group $\beta$ is all of pixels existing in an oblong area where pixels of which luminance difference with an adjacent pixel is a predetermined threshold value or more are included for a predetermined number or more in the first image.

6. A digital camera, comprising:
    an imaging unit capturing a plurality of pieces of images which are anteroposterior in a chronological order; and
    an image processing apparatus according to claim 1, treating the plurality of pieces of images captured by the imaging unit as an object of image processing.

7. A non-transitory recording medium storing an image processing program executable by a computer which detects a change amount between a first image and a second image which are anteroposterior in a chronological order, the image processing program comprising:
    a gain calculating step performing a geometric transformation on a specific pixel group $\alpha'$ extracted from the first image using an input position shift amount as a geometric transformation parameter, and calculating a gain value based on a luminance difference between pixels of the specific pixel group a in the first image after the geometric transformation is performed and pixels in the second image existing at an identical coordinate as the pixels of the specific pixel group $\alpha$;
    a position shift amount calculating step multiplying the gain value being input to the second image, extracting a specific pixel group $\beta$ from the first image, and calculating a position shift amount by estimating a position change amount of the specific pixel group $\beta$ between the first image and the second image to which the gain value is multiplied; and
    a detecting step detecting the change amount by executing the gain calculating step and the position shift amount calculating step for at least one time or more using the position shift amount calculated by the position shift amount calculating step as an input for the gain calculating step and the gain value calculated by the gain calculating step as an input for the position shift amount calculating step.

8. The non-transitory recording medium according to claim 7, wherein
    the specific pixel group $\alpha$ is an aggregation of pixels having an intermediary tone value in the first image.

9. The non-transitory recording medium according to claim 7, wherein
    the specific pixel group $\alpha$ is all of pixels existing in an oblong area where pixels having an intermediary tone value are included for a predetermined number or more in the first image.

10. The non-transitory recording medium according to claim 7, wherein
the specific pixel group β is an aggregation of pixels of which a luminance difference with an adjacent pixel is a predetermined threshold value or more among pixels in the first image.

11. The non-transitory recording medium according to claim 7, wherein
the specific pixel group β is all of pixels existing in an oblong area where pixels of which luminance difference with an adjacent pixel is a predetermined threshold value or more are included for a predetermined number or more in the first image.

12. A digital camera, comprising:
an imaging unit capturing a plurality of pieces of images which are anteroposterior in a chronological order; and
an image processing apparatus according to claim 2, treating the plurality of pieces of images captured by the imaging unit as an object of image processing.

13. A digital camera, comprising:
an imaging unit capturing a plurality of pieces of images which are anteroposterior in a chronological order; and
an image processing apparatus according to claim 3, treating the plurality of pieces of images captured by the imaging unit as an object of image processing.

14. A digital camera, comprising:
an imaging unit capturing a plurality of pieces of images which are anteroposterior in a chronological order; and
an image processing apparatus according to claim 4, treating the plurality of pieces of images captured by the imaging unit as an object of image processing.

15. A digital camera, comprising:
an imaging unit capturing a plurality of pieces of images which are anteroposterior in a chronological order; and
an image processing apparatus according to claim 5, treating the plurality of pieces of images captured by the imaging unit as an object of image processing.

* * * * *